(12) United States Patent
Camacho et al.

(10) Patent No.: US 10,347,125 B2
(45) Date of Patent: Jul. 9, 2019

(54) DYNAMIC UPDATING OF ROUTE ELIGIBILITY FOR SEMI-AUTONOMOUS DRIVING

(71) Applicants: GENERAL MOTORS LLC, Detroit, MI (US); GM GLOBAL TECHNOLOGY OPERATIONS LLC, Detroit, MI (US)

(72) Inventors: Esteban Camacho, Belleville, MI (US); Alexander X. Cermak, Grosse Pointe Woods, MI (US); Ryan Olejniczak, Clinton Township, MI (US); Curtis L. Hay, West Bloomfield, MI (US); Praneeth Nelapati, Farmington Hills, MI (US)

(73) Assignees: GM Global Technology Operations LLC, Detroit, MI (US); General Motors LLC, Detroit, MI (US)

( * ) Notice: Subject to any disclaimer, the term of this patent is extended or adjusted under 35 U.S.C. 154(b) by 148 days.

(21) Appl. No.: 15/292,724

(22) Filed: Oct. 13, 2016

(65) Prior Publication Data
US 2018/0108254 A1    Apr. 19, 2018

(51) Int. Cl.
*G08G 1/0968* (2006.01)
*B60W 30/14* (2006.01)
(Continued)

(52) U.S. Cl.
CPC ....... *G08G 1/096805* (2013.01); *B60W 30/12* (2013.01); *B60W 30/143* (2013.01);
(Continued)

(58) Field of Classification Search
CPC ....... G08G 1/096805; G08G 1/096775; G08G 1/096716; G08G 1/0141; G08G 1/0133;
(Continued)

(56) References Cited

U.S. PATENT DOCUMENTS

| | | | |
|---|---|---|---|
| 2014/0358840 A1* | 12/2014 | Tadic | B60W 40/09 706/52 |
| 2015/0254986 A1* | 9/2015 | Fairfield | G08G 1/22 707/687 |

(Continued)

*Primary Examiner* — Muhammad Shafi
(74) *Attorney, Agent, or Firm* — Reising Ethington P.C.; David Willoughby (57) ABSTRACT

A system and method for communicating with a plurality of vehicles. The method includes receiving route information from a plurality of telematics units installed into each of the vehicles. The information may be collected as the vehicles are traveling along a vehicle route. The method further includes determining an eligibility of the vehicle route for use with a semi-autonomous driving system of the vehicles from at least the received route information. The method may also include communicating the eligibility of the vehicle route to the vehicles. The system includes a plurality of telematics units configured to collect route information as the vehicles are traveling along a vehicle route. The system further includes a database in communication with the plurality of telematics units. The database includes an eligibility of the vehicle route for use with a super cruise system of the vehicles.

20 Claims, 2 Drawing Sheets

(51) Int. Cl.
*B60W 50/08* (2012.01)
*B60W 50/12* (2012.01)
*B60W 50/14* (2012.01)
*G01C 21/34* (2006.01)
*G01C 21/36* (2006.01)
*G05D 1/00* (2006.01)
*G05D 1/02* (2006.01)
*G08G 1/0967* (2006.01)
*G08G 1/16* (2006.01)
*B60W 30/12* (2006.01)
*B60W 30/16* (2012.01)
*G08G 1/01* (2006.01)
*B60W 50/00* (2006.01)

(52) U.S. Cl.
CPC .......... *B60W 30/16* (2013.01); *B60W 50/082* (2013.01); *B60W 50/12* (2013.01); *B60W 50/14* (2013.01); *G01C 21/3415* (2013.01); *G01C 21/3691* (2013.01); *G05D 1/0088* (2013.01); *G05D 1/0278* (2013.01); *G05D 1/0287* (2013.01); *G08G 1/0112* (2013.01); *G08G 1/0129* (2013.01); *G08G 1/0133* (2013.01); *G08G 1/0141* (2013.01); *G08G 1/096708* (2013.01); *G08G 1/096716* (2013.01); *G08G 1/096741* (2013.01); *G08G 1/096775* (2013.01); *G08G 1/096844* (2013.01); *G08G 1/163* (2013.01); *B60W 2050/0089* (2013.01); *B60W 2050/146* (2013.01); *B60W 2420/42* (2013.01); *B60W 2550/141* (2013.01); *B60W 2550/402* (2013.01); *B60W 2550/408* (2013.01)

(58) Field of Classification Search
CPC ............... G08G 1/0129; G08G 1/0112; G08G 1/096741; G08G 1/096708; G08G 1/163; G08G 1/096844; B60W 30/12; B60W 30/16; B60W 50/14; B60W 50/082; B60W 50/12; B60W 30/143; B60W 2550/408; B60W 2050/0089; B60W 2550/141; B60W 2550/402; B60W 2420/42; B60W 2050/146; G05D 1/0287; G05D 1/0278; G05D 1/0088; G01C 21/3691; G01C 21/3415
USPC .......................................................... 701/26
See application file for complete search history.

(56) References Cited

U.S. PATENT DOCUMENTS

2016/0093213 A1* 3/2016 Rider ................... G08G 1/0965
    701/537
2018/0059687 A1* 3/2018 Hayes ................ G01C 21/3415

* cited by examiner

DYNAMIC UPDATING OF ROUTE ELIGIBILITY FOR SEMI-AUTONOMOUS DRIVING

TECHNICAL FIELD

The present invention relates to systems and methods for communicating with vehicles, and more particularly to systems and methods for communicating with vehicles regarding routes that are eligible for use with a semi-autonomous driving system, e.g., a super cruise system.

BACKGROUND

Cruise control systems generally facilitate maintaining a set speed of a vehicle traveling along a road or highway. More recently, cruise control systems have been developed with features that allow an automatic decrease or increase of vehicle speed in response to the detection of other vehicle/objects around the vehicle. Moreover, semi-autonomous driving systems are being developed which may allow at least partial control of vehicle driving systems, increasing the degree to which the vehicle takes over driving tasks from vehicle occupants. Semi-autonomous driving systems facilitate partial control of vehicle driving systems, as distinguished from fully autonomous systems which entirely take over guidance of the vehicle from the driver while the system is activated.

Semi-autonomous driving systems, referred to in some cases as a "super cruise" system, are typically adapted for use primarily on highways and other roads where travel at a generally consistent and/or elevated speed is safely possible. Accordingly, a semi-autonomous driving system typically is not appropriate for all routes or roads. Semi-autonomous systems therefore may rely upon maps or route data to determine whether a semi-autonomous driving system such as a super cruise system may be used while traversing a particular route. However, such systems are relatively recently developed, and therefore road data can be inaccurate. Moreover, road and vehicle conditions change in real-time, and may affect the degree to which a semi-autonomous system may be safely used on a particular route.

SUMMARY

In accordance with one aspect of the invention, there is provided a method of communicating with a plurality of vehicles may include receiving route information from a plurality of telematics units installed into each of the vehicles. The information may be collected as the vehicles are traveling along a vehicle route. The method further includes determining an eligibility of the vehicle route for use with a semi-autonomous driving system of the vehicles from at least the received route information. The method may also include communicating the eligibility of the vehicle route to the vehicles.

In at least some embodiments, route information includes at least image data collected passively by the vehicles, and information relating to driver interventions during operation of the super cruise system in one of the vehicles.

In accordance with another aspect of the invention, there is provided a system for communicating with a plurality of vehicles may include a plurality of telematics units installed into each of the vehicles. The telematics units are configured to collect route information as the vehicles are traveling along a vehicle route. The route information may include at least information relating to driver interventions during operation of the super cruise system in one of the vehicles. The system may further include a database in communication with the plurality of telematics units. The database may include an eligibility of the vehicle route for use with a super cruise system of the vehicles. The eligibility may be determined from at least the route information received from the telematics units.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

As noted above, some conditions affecting compatibility of a road, route, or portion thereof with a semi-autonomous driving system for a vehicle may change in real time. The embodiments discussed herein may generally employ vehicles being driven on the road to determine appropriate locations where use of semi-autonomous driving systems such as super cruise systems may be allowed by vehicles. Moreover, data collected by the vehicles can be used to modify, e.g., in real time, a map or database of roads or routes that are compatible for use with a given semi-autonomous driving system.

Generally, a vehicle may provide information relating to the compatibility of a route with a semi-autonomous driving system in the form of data relating to how a semi-autonomous driving system is used by the vehicle on the route. For example, information relating to the activation/deactivation of a semi-autonomous driving system of a vehicle, or interventions by the driver during the use of the system, may be used to determine whether the semi-autonomous driving system should be permitted for use by the vehicle or other vehicles traversing the same route. Additionally, information relating to the conditions/surroundings associated with routes being driven by the vehicle may also be used to determine whether the route is compatible with use of a semi-autonomous driving system. Merely as one example, image data collected by vehicle cameras may be used to determine whether a traffic incident or construction event is causing abnormal travel conditions which make use of a semi-autonomous driving system dangerous or otherwise unadvisable.

Information collected by the vehicle(s) may be provided to a remote facility, e.g., a central office or backoffice facility, which may establish a database or map of routes in a given area or region where use of a semi-autonomous driving system may be permitted. Information may be collected from vehicles in real-time, i.e., as the vehicle(s) traverses the route(s) in question. Information may be analyzed by the central office in real-time, or on a periodic basis. The information may be provided to vehicles collectively in the area, e.g., by way of a central database or map. For example, vehicles may pull route information from the database/map to determine appropriate route(s) for use of a semi-autonomous driving system in any manner that is convenient. In some examples, a vehicle telematics unit may selectively communicate with the remote facility to determine whether a route may be used with a semi-autonomous driving system.

Exemplary semi-autonomous driving systems may generally control vehicle speed and steering of the vehicle. Typically, semi-autonomous driving systems are most appropriate for use on highways or other routes where changes in vehicle speed or changes in vehicle course such as turns on/off a given road are not needed frequently. Thus, the aim of semi-autonomous driving systems in general is to temporarily take over navigation of a vehicle, e.g., by modifying vehicle speed and/or changing lanes as needed to guide the vehicle around other vehicles on the same road. Typically, semi-autonomous driving systems are most appropriate on highways, expressways, or the like, although applications of these systems are not strictly limited. Accordingly, with respect to vehicle speed, a semi-autonomous driving system may generally maintain a set vehicle speed, slow down, or speed up the vehicle as needed to guide the vehicle along a given route or road while avoiding obstacles such as other vehicles. With respect to steering of the vehicle, a semi-autonomous driving system may generally steer the vehicle as needed to keep a vehicle in a single lane moving through a curve in the road, or to change lanes to pass a slower moving vehicle, thereby guiding the vehicle along a given route or road while avoiding obstacles such as other vehicles. In some examples, a semi-autonomous driving system may be referred to as a "super cruise" system.

Communications System

Figure 1:
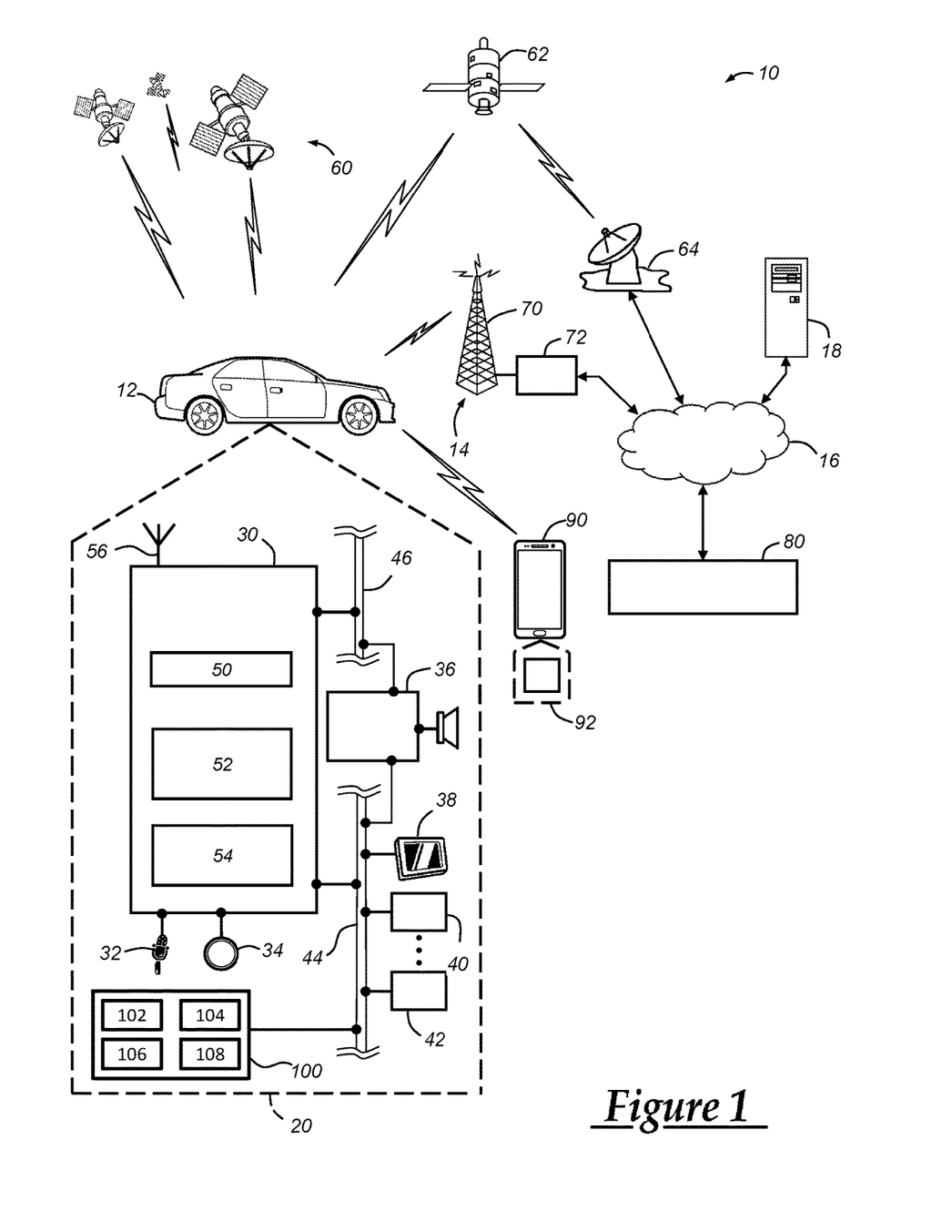
FIG. 1 is a block diagram depicting an embodiment of a communications system that is capable of utilizing the exemplary methods disclosed herein.

With reference to FIG. 1, there is shown an operating environment that comprises a mobile vehicle communications system 10 and that can be used to implement the methods disclosed herein. Communications system 10 generally includes a vehicle 12, one or more wireless carrier systems 14, a land communications network 16, a computer 18, a remote facility 80, and a mobile device 90. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed methods as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and include a telematics unit 30, a microphone 32, one or more pushbuttons or other control inputs 34, an audio system 36, a visual display 38, a GPS module 40, a cruise control system 100, as well as a number of other vehicle system modules (VSMs) 42. Some of these devices can be connected directly to the telematics unit such as, for example, microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with remote facility 80, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art, or via other wireless communication methods, e.g., SMS/text messages. For combined services that involve both voice communication (e.g., with a live advisor or voice response unit at the remote facility 80) and data communication (e.g., to provide GPS location data or vehicle diagnostic data to the remote facility 80), the system can utilize a single call over a voice channel and switch as needed between voice and data transmission over the voice channel, and this can be done using techniques known to those skilled in the art.

According to one embodiment, telematics unit 30 utilizes cellular communication according to GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™ Wi-Fi direct, Bluetooth, or near field communication (NFC). When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to remote facility 80 or other remote computer system, such as computer 18, for other purposes, such as fleet management. Also, new or updated map data can be downloaded to the GPS module 40 from the remote facility 80 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 20 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the remote facility 80. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Adaptive cruise control system 100 controls components of the vehicle power system (e.g., the throttle valve of a vehicle with an internal combustion engine or the power controller regulating power delivery from a vehicle battery to an electric motor in an electric vehicle) and vehicle brake system to maintain a predetermined vehicle speed and/or vehicle position relative to other vehicles. In some examples, the cruise control system 100 provides, at least in part, semi-autonomous driving of the vehicle 12. Accordingly, in addition to controlling speed and/or position of the vehicle 12 relative to other vehicles, the cruise control system 100 may control steering wheel position of the vehicle 12, or otherwise guide the vehicle 12 by directing the vehicle 12 while the cruise control system 100 is activated. The cruise control system 100 may therefore be a super cruise system, where the vehicle 12 generally guides the vehicle 12 on a road such that a driver can cruise at a desired speed or range of speeds, and need not manually steer the vehicle 12 to maintain the vehicle in a desired lane and/or avoid other vehicles.

System 100 may include a user interface 102, vehicle interface 104, communications module 106 and controller 108. User interface 102 is configured to receive inputs from a driver of vehicle 12 including a desired vehicle speed and desired position relative to other vehicles and to generate outputs to the driver or other vehicle occupants including confirmation of the inputs. The cruise control system 100 may receive other information input by the driver, e.g., a destination point or route, along which the cruise control system 100 is to guide the vehicle 12. The cruise control system 100 may receive such inputs directly from the driver by way of the user interface 102, or from other vehicle components via the vehicle interface 104. For example, the cruise control system 100 may receive instructions or information from the telematics unit 30 over the bus 44. The user interface 102 may include any combination of hardware, software and/or other components that enable the driver to exchange information or data with the vehicle 12. The interface 102 typically includes touch screen displays, push-buttons or other mechanisms on the instrument panel (or dashboard) or steering column. Vehicle interface 104 is configured to receive input signals from a plurality of sensors used to detect operating conditions of the vehicle including, for example, wheel speed sensors that are coupled to each wheel of vehicle 12 and separately report the rotational velocity of each wheel and sensors that are used to detect the position of other vehicles on the road including, for example, light detection and ranging (LIDAR) devices, ultrasonic devices, radio detection and ranging (RADAR) devices, and vision devices (e.g., cameras, etc.) used in vehicle collision avoidance systems such as a forward collision warning systems, front automatic braking systems, forward or rear park assist systems, lane departure warning systems, side blind zone alert systems, side or rear object detection systems, or rear automatic braking systems. Interface 104 is also configured to transmit output signals to components of the vehicle power system and vehicle brake system for use in controlling the vehicle power system and vehicle brake system. Communications module 106 may include any combination of hardware, software and/or other components that enable wireless voice and/or data communication between system 100 and systems external to vehicle 12 or internal to vehicle 12 such as telematics unit 30. Module 106 may, for example, include a radio transceiver configured for short range wireless communication with telematics unit 30 using short-range wireless technologies such as Wi-Fi (IEEE 802.11), WiMAX, Wi-Fi direct, Bluetooth, Zigbee, near field communication (NFC), etc. in order to obtain geographic information such as updated maps used in predictive control. Controller 108 is configured to generate control signals for the vehicle power system and vehicle brake system responsive to inputs received through the user interface 102, vehicle interface 104 and communications module 106. The controller 108 may include various electronic processing devices (e.g., a microprocessor, a microcontroller, an application specific integrated circuit (ASIC), etc.) and memory devices.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to remote facility 80. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, remote facility 80 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or remote facility 80, or both. A computer 18 can also be used for providing Internet connectivity such as DNS services or as a network address server that uses DHCP or other suitable protocol to assign an IP address to the vehicle 12.

Remote facility 80 is designed to provide the vehicle electronics 20 with a number of different system back-end functions. The remote facility 80 may include one or more switches, servers, databases, live advisors, as well as an automated voice response system (VRS), all of which are known in the art. Remote facility 80 may include any or all of these various components and, preferably, each of the various components are coupled to one another via a wired or wireless local area network. Remote facility 80 may receive and transmit data via a modem connected to land network 16. A database at the remote facility can store account information such as subscriber authentication information, vehicle identifiers, profile records, behavioral patterns, and other pertinent subscriber information. Data transmissions may also be conducted by wireless systems, such as 882.11x, GPRS, and the like. Although the illustrated embodiment has been described as it would be used in conjunction with a manned remote facility 80 using a live advisor, it will be appreciated that the remote facility can instead utilize a VRS as an automated advisor or, a combination of the VRS and the live advisor can be used.

The remote facility 80 may include a database of roads, routes, locations, etc. permitted for use with a semi-autonomous driving system associated with one or more vehicles 12. As will be described further below, the remote facility may communicate with the vehicle(s) 12 to provide route guidance in response to a request received from the vehicle(s) 12. For example, based upon information received from one or more of the vehicles 12, the remote facility 80 may determine which roads or routes are compatible for use with a semi-autonomous driving system such as cruise control system 100. Vehicles 12 may, for example in the course of determining a navigation route, receive instructions from the remote facility 80 regarding which roads or portions thereof, if any, are compatible for use with the cruise control system. The instructions from the remote facility 80, including which road(s) are eligible for super cruising or use of the cruise control system 100, may be based at least in part upon the information received from one or more of the vehicles 12 regarding the road(s). Accordingly, remote facility 80 may receive information regarding the roads/routes generally in real-time from one or more vehicles 12.

Mobile device 90 is a non-vehicle device, meaning that it is not a part of vehicle 12 or vehicle electronics 20. The mobile device includes: hardware, software, and/or firmware enabling cellular telecommunications and/or short range wireless communication (SRWC), as well as other wireless device functions and applications. The hardware of mobile device 90 comprises a processor and memory for storing the software, firmware, etc. This memory may include volatile RAM or other temporary powered memory, as well as a non-transitory computer readable medium that stores some or all of the software needed to carry out the various external device functions discussed herein. The mobile device processor and software stored in the memory enable various software applications, which may be preinstalled or installed by the user (or manufacturer) (e.g., having a software application or graphical user interface (GUI)). This may include an application 92 that can allow a vehicle user to communicate with vehicle 12 and/or to control various aspects or functions of the vehicle—e.g., among other things, allowing the user to remotely lock/unlock vehicle doors, turn the vehicle ignition on or off, check the vehicle tire pressures, fuel level, oil life, etc. The application may also be used to enable the user of device 90 to view information pertaining to the vehicle (e.g., the current location of the vehicle, whether the vehicle is locked or unlocked) and/or pertaining to an account associated with the user or vehicle. Wireless device 90 is shown as a smartphone having cellular telephone capabilities. In other embodiments, device 90 may be a tablet, laptop computer, or any other suitable device. In addition, application 92 may also allow the user to connect with the remote facility 80 or call center advisors at any time.

While a single vehicle 12 is illustrated in FIG. 1, in the exemplary methods described below it should be understood that multiple vehicles 12, and in some cases many vehicles 12, may be present. For example, a number of vehicles 12 may be traveling on one or more roads, and communicating with remote facility 80 to provide information regarding the roads. More specifically, as described above, information may be provided to the remote facility 80 which may be used to determine an eligibility of the roads traveled for use in conjunction with semi-autonomous driving provided by the cruise control system 100.

Method—

Figure 2:
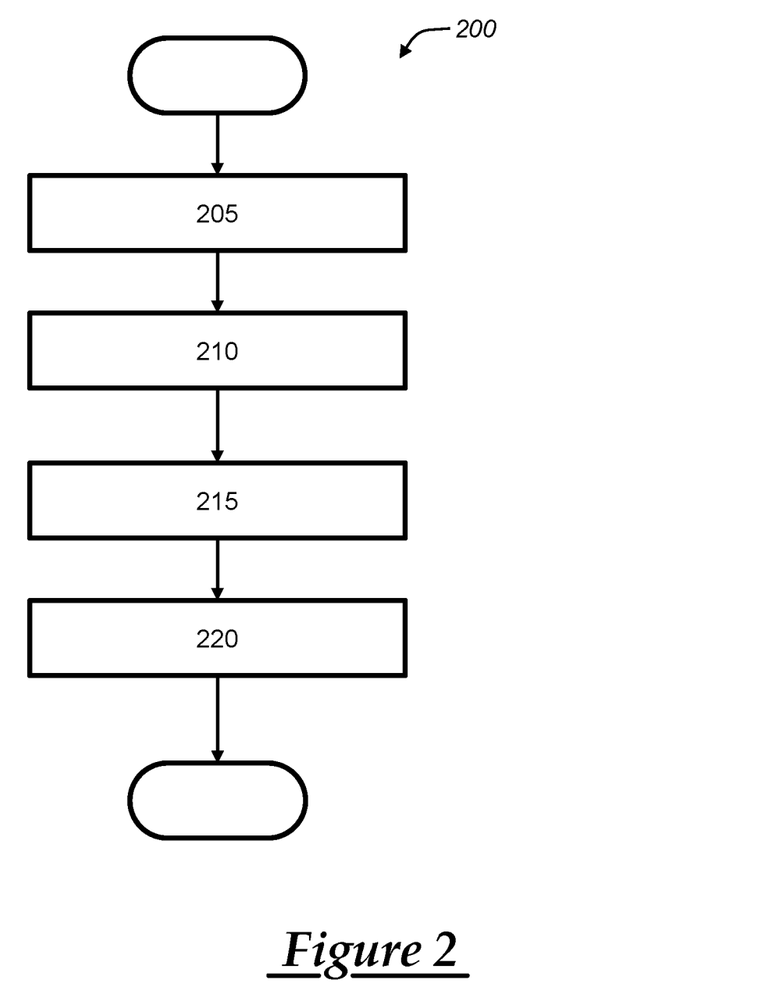
FIG. 2 is a process flow diagram illustrating exemplary methods of communicating with one or more vehicles.

Turning now to FIG. 2, a process flow diagram illustrating various exemplary methods of communicating with one or more vehicles is shown. Process 200 may begin at block 205, where one or more vehicles collect route information. For example, as noted above, a vehicle 12 may be traveling on a road, route, or portion thereof, and may collect information relating to characteristics of the road or conditions that may affect use of a semi-autonomous or super cruise capability of the vehicle 12. Moreover, information may be collected by a plurality of vehicles 12. Information may be collected from the vehicles 12 in any manner that is convenient—for example, at predetermined intervals, or upon the occurrence of an event that may affect use of a semi-autonomous or super cruise capability of the vehicle 12.

Some information collected by the vehicle(s) 12 may relate to a history or usage associated with a semi-autonomous driving mode of each vehicle(s) 12. For example, interactions of the driver of a vehicle 12 with the cruise control system 100 may provide an indication that use of a super cruise mode is not appropriate, unsafe, or otherwise not desirable. A road or route may initially be considered eligible for use of a super cruise function, but upon driving the route in a super cruise mode in vehicle 12, the driver may intervene to cease the super cruise function. Such interventions may occur due to relatively heavy traffic, construction, or other impediments to using the super cruise mode of the cruise control system 100. Merely as examples, interventions by a driver of the vehicle 12 may include manually taking over control of a steering wheel of the vehicle 12, braking the vehicle manually with a brake pedal, pushing a button to deactivate a super cruise mode of the cruise control system 100, a voice command, or any other action that is convenient to cease super cruising of the vehicle 12. Such interventions by driver(s) of one or more vehicles 12, as noted above, may provide an indication that the route should not be permitted for use of super cruise systems, at least temporarily. Where such interventions occur, vehicle 12 may log pertinent vehicle information, such as vehicle speed, location, or the like, associated with the intervention.

Other information collected by the vehicle 12 may include image data, e.g., collected by one or more cameras of the vehicle. For example, image data collected by the vehicle may provide visual evidence of any conditions around the vehicle causing the driver to deactivate a super cruise mode of the cruise control system 100. Image data may be collected by the vehicle 12 passively, such that the vehicle 12 collects image data, for example upon the occurrence of an intervention during super cruising, generally without any occupant of the vehicle 12 initiating the image collection. Image data may be provided alternatively or in addition to any other information collected by the vehicle 12. In some examples, collection of image data may be triggered by an intervention or other event during usage of a super cruise mode of the cruise control system 100. Process 200 may then proceed to block 210.

At block 210, route information may be received from one or more telematics units installed into corresponding vehicles. For example, where a plurality of vehicles 12 are traveling on a road, route, or in a given region, telematics units 30 of one or more of the vehicles 12 may provide information collected in block 205 to remote facility 80. In other words, one or more vehicles 12 may communicate with the remote facility 80, providing information regarding the particular route, road, or location being traversed by the vehicles 12. Remote facility 80 may update a database of information used to determine compatibility of a road, route, or region with super cruising of vehicle generally with the information received from the vehicle(s) 12.

Proceeding to block 215, an eligibility of one or more vehicle routes for use in a semi-autonomous driving mode of the vehicles, e.g., a super cruise mode, may be determined. For example, remote facility 80 may analyze the route information received from one or more vehicles 12 in block 210 to determine whether changes to the compatibility of the route(s) with a super cruising mode of the vehicles would be appropriate. In one example, remote facility 80 may receive information from a number of vehicles on a given road or in a given area indicating that the vehicles are deactivating their super cruise function at a certain point, e.g., a curve in the road. Additional information may indicate that an accident occurred near the curve, e.g., as indicated by image data received from the vehicles 12, and remote facility 80 may infer that the drivers of the vehicles 12 deactivated their super cruise mode upon seeing the accident, traffic slowing as a result, etc.

Remote facility 80 may use any method that is convenient to determine whether and when to change eligibility of a road or route for semi-autonomous driving modes such as super cruise. Merely as one example, remote facility 80 may determine that a change to a route's eligibility should be made upon an indication that a predetermined percentage of vehicles in the area have acted in a manner inconsistent with the previously determined eligibility. More specifically, where a road has been determined previously as being eligible for super cruising, the remote facility 80 may initiate a change to the road's eligibility when more than half of vehicles 12 traveling the area in the recent past have ceased use of super cruise functions in the same area. The remote facility 80 may determine road eligibility as part of a batch analysis, e.g., of information received from vehicles 12, performed at regular intervals. Process 200 may then proceed to block 220.

At block 220, the eligibility of the vehicle route(s) may be communicated to one or more vehicles 12. For example, remote facility 80 may prevent vehicles 12 from activating a super cruise mode where it has been determined that a road should at least temporarily not be eligible for use of a super cruise mode. Continuing the example above, a road determined to have an accident or construction event causing a temporary slowdown may not be eligible for super cruising until the temporary slowdown identified by the vehicles 12 in the area of the accident clears. In this manner, remote facility 80 may generally provide vehicles 12 with eligible or compatible routes for use of a semi-autonomous driving mode such as super cruise, and update route availability in real-time based upon conditions reported collectively by the vehicles 12. Eligibility or compatibility of a road, route, or region with a semi-autonomous driving mode such as super cruise may be communicated in any manner that is convenient. In some examples, the eligibility is communicated by the remote facility 80 to the vehicles upon request from the vehicles. More specifically, when a vehicle 12 is attempting to activate a super cruise mode or use navigation services including identifying roads for use in a semi-autonomous driving mode, the remote facility 80 may provide instructions to the vehicle 12, e.g., by way of the telematics unit 30, indicating what roads/routes are presently available for super cruise usage. In another approach, eligibility of roads/routes may be communicated by remote facility 80 to the vehicles 12 on a periodic basis. More specifically, the vehicles 12 may maintain a local database of routes/roads where use of a super cruise feature is allowed, with the remote facility 80 communicating updates to the vehicles 12 upon receipt of information from any other vehicles 12 indicating that a change to the database should be made. Process 200 may then terminate.

Accordingly, remote facility 80 may use information reported collectively by one or more vehicles 12 to instruct vehicles 12 regarding roads or routes that may be used with a semi-autonomous driving feature, such as super cruise. Vehicles 12 may thereby quickly receive information indicating areas in a route where super cruising functions may be unsafe or otherwise undesirable.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of updating an eligibility of vehicle routes for semi-autonomous driving by providing a real-time semi-autonomous route eligibility map to a plurality of semi-autonomous vehicles, comprising the steps of:

(a) receiving route information from a plurality of telematics units installed into each of the vehicles, each vehicle having a semi-autonomous driving system having a semi-autonomous driving mode wherein the semi-autonomous driving system maintains at least a set speed of the vehicle and steering control of the vehicle, the semi-autonomous driving system having a manual mode where a driver controls at least one of vehicle speed and vehicle steering, the information relating to compatibility of the route with the semi-autonomous driving mode and collected in real-time as the vehicles are traveling along a vehicle route, the information received in the form of digital data sent wirelessly from the telematics units;

(b) determining a current eligibility of the vehicle route for use with the semi-autonomous driving mode of the vehicles from at least the real-time route information received in step (a); and (c) storing the received digital data including the current eligibility of the vehicle route in the semi-autonomous route map in a database, and communicating the eligibility of the vehicle route to the vehicles via the route map to restrict access to the semi-autonomous driving mode such that each of the vehicles are (1) permitted to use the semi-autonomous driving mode when the vehicle is on a route determined to be eligible for use with the semi-autonomous driving mode, and (2) prevented from using the semi-autonomous mode when the vehicle is on a route determined to be ineligible for use with the semi-autonomous driving mode.

2. The method of claim 1, wherein the route information received in step (a) includes at least image data collected by the vehicles.

3. The method of claim 2, wherein the image data is collected passively by the vehicles.

4. The method of claim 1, wherein the route information includes information relating to driver interactions with the semi-autonomous driving system of the vehicles.

5. The method of claim 4, wherein the driver interactions include a driver intervention in one of the vehicles while the vehicle is in the semi-autonomous driving mode.

6. The method of claim 5, wherein the information relating to the driver interactions includes at least one of a vehicle speed and a vehicle location associated with the driver intervention.

7. The method of claim 5, wherein the driver intervention includes at least a manual steering of the vehicle while the vehicle is in the semi-autonomous driving mode.

8. The method of claim 5, wherein the driver intervention includes at least a manual brake pedal application while the vehicle is in the semi-autonomous driving mode.

9. The method of claim 5, wherein the driver intervention includes at least a deactivation of the semi-autonomous driving mode by the driver.

10. The method of claim 5, further comprising collecting image data from at least one of the vehicles in response to the driver intervention.

11. The method of claim 10, further comprising changing an eligibility of the vehicle route based upon a temporary condition identified by the image data.

12. The method of claim 1, wherein the eligibility communicated in step (b) is communicated from the database to the vehicles on a periodic basis.

13. The method of claim 1, wherein the eligibility communicated in step (b) is communicated from the database to the vehicles upon request from the vehicles.

14. The method of claim 1, wherein the semi-autonomous driving system is a super cruise system.

15. The method of claim 1, further comprising temporarily preventing access to the semi-autonomous driving mode on at least one of the vehicle routes in response to a temporary condition identified in the received route information, and subsequently allowing access to the semi-autonomous driving mode on the at least one of the vehicle routes after the temporary condition is no longer present.

16. The method of claim 15, further comprising identifying the condition based at least upon a predetermined percentage of vehicles traversing the at least one of the vehicle routes deactivating the semi-autonomous driving mode.

17. A method of updating an eligibility of vehicle routes for semi-autonomous driving by providing a real-time semi-autonomous route eligibility map to a plurality of semi-autonomous vehicles, comprising the steps of:

(a) receiving route information from a plurality of telematics units installed into each of the vehicles, each vehicle having a semi-autonomous driving system having a semi-autonomous driving mode wherein the semi-autonomous driving system maintains at least a set speed of the vehicle and steering control of the vehicle, the semi-autonomous driving system having a manual mode where a driver controls at least one of vehicle speed and vehicle steering, the information relating to compatibility of the route with the semi-autonomous driving mode and collected in real-time as the vehicles are traveling along a vehicle route, the information received in the form of digital data sent wirelessly from the telematics units,
wherein the route information includes at least:
(i) image data collected passively by the vehicles in real-time; and
(ii) information relating to driver interventions during operation of a semi-autonomous driving system in one or more of the vehicles, wherein the driver intervention includes at least a deactivation of the semi-autonomous driving mode by the driver, wherein the image data is collected by the vehicle in response to the deactivation of the semi-autonomous driving mode;

(b) determining a current eligibility of the vehicle route for use with the semi-autonomous driving mode of the vehicles from at least the real-time route information received in step (a);

(c) storing the received digital data including the current eligibility of the vehicle route in the semi-autonomous route map in a database, and communicating the eligibility of the vehicle route to the vehicles via the route map to restrict access to the semi-autonomous driving mode such that each of the vehicles are (1) permitted to use the semi-autonomous driving mode when the vehicle is on a route determined to be eligible for use with the semi-autonomous driving mode, and (2) prevented from using the semi-autonomous mode when the vehicle is on a route determined to be ineligible for use with the semi-autonomous driving mode.

18. The method of claim 17, further comprising temporarily preventing access to the semi-autonomous driving mode on at least one of the vehicle routes in response to a temporary condition identified by the image data collected in response to the deactivation of the semi-autonomous driving mode; and subsequently allowing access to the semi-autonomous driving mode on the at least one of the vehicle routes after the temporary condition is no longer present.

19. A system for updating an eligibility of vehicle routes for semi-autonomous driving by providing a real-time semi-autonomous route eligibility map to a plurality of semi-autonomous vehicles, comprising:
a plurality of telematics units installed into each of the vehicles, the telematics units configured to collect route information in real-time as the vehicles are traveling along a vehicle route, the telematics units configured to wirelessly transmit the information in the form of digital data, wherein the route information includes at least information relating to driver interventions during operation of a semi-autonomous driving system in one or more of the vehicles, the semi-autonomous driving system(s) each having a semi-autonomous driving mode wherein the semi-autonomous driving system maintains at least a set speed of the vehicle and steering control of the vehicle, the semi-autonomous driving system having a manual mode where a driver controls at least one of vehicle speed and vehicle steering, the route information relating to compatibility of the vehicle route with the semi-autonomous driving mode; and a database in communication with the plurality of telematics units and configured to store the received digital data in the semi-autonomous route map, including a current eligibility of the vehicle route for use with the semi-autonomous driving mode of the vehicles, the eligibility determined from at least the real-time route information received from the telematics units;

wherein the plurality of telematics units are in communication with the database to access the route map; and wherein the database restricts access to the semi-autonomous driving mode of each of the vehicles such that each of the vehicles are (1) permitted to use the semi-autonomous driving mode when the vehicle is on a route determined to be eligible for use with the semi-autonomous driving mode, and (2) prevented from using the semi-autonomous mode when the vehicle is on a route determined to be ineligible for use with the semi-autonomous driving mode.

20. The system of claim 19, further comprising at least one camera installed on each of the vehicles, the camera configured to passively collect image data collected passively by the vehicles, wherein the image data is included in the route information collected by the telematics units.

* * * * *